(12) United States Patent
Zwierschke et al.

(10) Patent No.: US 9,139,787 B2
(45) Date of Patent: *Sep. 22, 2015

(54) METHOD FOR STEAM REFORMING CARBONACEOUS MATERIAL

(75) Inventors: Jayson Zwierschke, Fonthill (CA); Earnest George Dueck, Fort Erie (CA)

(73) Assignee: Elementa Group Inc., Niagara-On-The-Lake (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/881,057

(22) Filed: Sep. 13, 2010

(65) Prior Publication Data

US 2011/0204294 A1    Aug. 25, 2011

Related U.S. Application Data

(63) Continuation of application No. 11/718,597, filed as application No. PCT/CA2006/000060 on Jan. 18, 2006, now Pat. No. 7,794,689.

(60) Provisional application No. 60/644,601, filed on Jan. 18, 2005.

(51) Int. Cl.
*C01B 3/02* (2006.01)
*C10J 3/72* (2006.01)
*C10J 3/00* (2006.01)
*C10J 3/06* (2006.01)
*C10J 3/20* (2006.01)
*C10K 3/00* (2006.01)

(52) U.S. Cl.
CPC *C10J 3/721* (2013.01); *C10J 3/005* (2013.01); *C10J 3/06* (2013.01); *C10J 3/20* (2013.01); *C10K 3/006* (2013.01); *C10J 2200/158* (2013.01); *C10J 2300/092* (2013.01); *C10J 2300/0916* (2013.01); *C10J 2300/0946* (2013.01); *C10J 2300/0973* (2013.01); *C10J 2300/1884* (2013.01)

(58) Field of Classification Search
USPC .......................................................... 252/373
See application file for complete search history.

(56) References Cited

U.S. PATENT DOCUMENTS 2,226,578 A * 12/1940 Payne ............................. 202/95
4,597,772 A    7/1986 Coffman
5,245,113 A *  9/1993 Schulz ......................... 588/317
5,645,744 A *  7/1997 Matsen et al. ................. 219/634

(Continued)

FOREIGN PATENT DOCUMENTS

CA    2496907 A1    3/2004
CN    1382202 A    11/2002

(Continued)

*Primary Examiner* — Melvin C Mayes
*Assistant Examiner* — Kenneth Vaden
(74) *Attorney, Agent, or Firm* — Bennett Jones LLP

(57) ABSTRACT

A method for steam reforming carbonaceous material into a synthesis gas by using a single stage process of heating the carbonaceous material in a rotary kiln at an elevated reforming temperature so that the carbonaceous material undergoes substantially complete conversion to synthesis gas or by using a dual stream, multiple-stage process of heating carbonaceous material to a reforming temperature, below that at which metallic materials will typically vaporize, to form gaseous and solid materials; further reforming the gaseous materials in a second stage reforming kiln at an elevated reforming temperature to form synthesis gas; and separating carbon char from the solid material for further processing.

11 Claims, 3 Drawing Sheets

(56) References Cited

U.S. PATENT DOCUMENTS

| | | | |
|---|---|---|---|
| 5,879,566 | A | 3/1999 | Snyder et al. |
| 6,005,149 | A | 12/1999 | Bishop |
| 6,514,318 | B2 * | 2/2003 | Keefer ............................. 95/96 |
| 6,519,926 | B2 | 2/2003 | Hazlebeck |
| 6,548,197 | B1 | 4/2003 | Chandran et al. |
| 6,837,910 | B1 | 1/2005 | Yoshikawa et al. |
| 7,764,689 | B2 | 7/2010 | Bernick et al. |
| 7,842,110 | B2 | 11/2010 | Mansour et al. |
| 2002/0035924 | A1 | 3/2002 | Keefer |
| 2004/0035788 | A1 * | 2/2004 | Schmid et al. ................ 210/634 |
| 2004/0115492 | A1 * | 6/2004 | Galloway ....................... 429/17 |
| 2005/0095183 | A1 * | 5/2005 | Rehmat et al. ................ 422/188 |
| 2006/0076275 | A1 * | 4/2006 | Smith ........................... 208/408 |

FOREIGN PATENT DOCUMENTS

| | | |
|---|---|---|
| JP | H08112580 | 5/1996 |
| JP | 2000296378 | 10/2000 |
| JP | 2001123175 A | 5/2001 |
| JP | 2003071418 | 3/2003 |
| JP | 2004075852 | 11/2004 |
| RU | 2204527 C2 | 5/2003 |
| WO | WO9955618 A1 | 11/1999 |
| WO | WO01/21735 A1 | 3/2001 |
| WO | WO2004004051 A1 | 1/2004 |
| WO | WO2004024620 A2 | 3/2004 |
| WO | WO2006076801 A1 | 7/2006 |

* cited by examiner

METHOD FOR STEAM REFORMING CARBONACEOUS MATERIAL

FIELD OF THE INVENTION

This invention relates generally to steam reforming technology.

BACKGROUND OF THE INVENTION

Steam reforming processes are known, and are used for converting various kinds of carbonaceous materials into useful commodities. The term carbonaceous material ("CM") as used herein includes any carbonaceous material, including: municipal solid waste ("MSW"); industrial, commercial and institutional waste ("ICIW"); medical waste; coal; coal waste; wood waste; sawdust; forest product waste; agricultural waste; sewage; liquid waste; hazardous waste; waste oil and oil by-products; electronic waste and other similar carbonaceous substances; also included are opportunity materials such as incineration and/or combustion ash, which may be used in order to achieve conversion upgrade opportunities in existing incineration plants.

In the steam reforming process, carbonaceous material is placed in a steam reforming kiln, which usually comprises a drum or kiln that is rotatable. Typically, the CM includes a substantial level of moisture. The drum is rotated to agitate the wet CM, while being heated. Heat is typically supplied by natural gas burners, syngas burners or electrical induction heating within the kiln, but external to the rotating drum.

Steam reforming is an endothermic process. However, unlike incineration, which is exothermic, there is no combustion. Rather, the CM, combined with water, is heated while being agitated, causing a reaction that produces a synthesis gas ("syngas"). The syngas consists primarily of hydrogen ($H_2$) and carbon-monoxide (CO).

A key difference between these two thermal processes is in the respective products generated by these processes. In the case of incineration/combustion, the products are primarily oxidized noxious compounds, whereas steam reforming produces largely beneficial syngas fuels with some minor acid and metal vapours typically much easier to clean than oxidized products of combustion.

Typically, the waste being used as the CM input to the steam reforming process comprises mostly hydrogen and carbon, and a small percentage of other elements such as chlorine, fluorine, sulfur, nitrogen, glass and various metals. For example, municipal solid waste (MSW) typically has a carbon/hydrogen/oxygen ratio of about 1/1.7/0.5. MSW also typically includes about 10% by weight of solid inert products.

In a typical prior art steam reforming process, the syngas is produced in a 2-stage process. First, the drum containing the water and CM is heated, typically for 90 minutes at temperatures in the range of 650° C. Then, the solid materials, including metals and char, are extracted from the drum. At this point, about 60-70% of the CM has been steam reformed to produce syngas. The typical process will then "polish" the syngas to convert remaining hydrocarbons to syngas and the pyrolytic char is separated from the remainder of inert inorganics and burned, or the complete mix of char plus other solids is disposed.

SUMMARY OF THE INVENTION

According to the invention, there are two different steam reforming processes, a single stream, one-stage process and a dual stream, multi-stage process.

The one-stage process is preferred for situations where the CM has a very small amount of metal in it. This is because the one-stage process described below involves employing temperatures that would vaporize metal. In cases where the amount of metal mixed with the CM is inconsequential, the one stage process is preferred because the amount of any metal vapours will be inconsequential. Where it is not technically feasible to remove substantially all metals mixed into the CM, the multi-stage process described below would/may preferably be used.

For both the one-stage process and the multi-stage process, CM, such as municipal solid waste ("MSW") is first shredded. (For the purposes of this description and for ease of reference, the input to the steam reforming process shall be referred to and considered as MSW; however, it should be understood that any CM may be used, and the process can be accordingly adapted for such).

Commercial lime (i.e. calcium oxide and/or a bicarbonate of soda) is mixed in with the shredded MSW. When the steam reforming is taking place, the calcium in the lime reacts with halogens that are released from the MSW, forming calcium salts that are generally benign. This feature is important because removing halogens in this early stage is simpler and less costly than removing them later downstream, which would typically involve using sorbent bed cleaning units. This also avoids the opportunity for these halogens to form acid vapours and/or the more highly toxic dioxins and furans, if these constituents come into contact with oxygen while at elevated temperatures during the steam reforming process. (The formation of dioxins and furans is one of the major problems with most incineration systems). Because the halogens react very readily with the lime, they are not available to form acid vapours and/or dioxins and furans. Note that with steam reforming, where most of the atmospheric air and hence oxygen is purged from the incoming waste stream (as described below), there will be little opportunity for conversions to the toxic dioxins and furans as there most certainly would be for combustion and incineration systems.

In both the one-stage and multi-stage processes, the shredded MSW is fed into a hopper, with the hopper containing an auger (i.e. a screw conveyor) for feeding the MSW into the steam reforming kiln. At the entrance into the kiln, the system provides a continuous feed of high temperature steam to purge the MSW entering the kiln of atmospheric air, and in particular, of nitrogen and oxygen. As will be explained further, the additional steam is beneficial to the steam reforming process, since this steam pre-heats the MSW and thereby captures some of the plant process waste heat. Meanwhile, it is also desirable to exclude nitrogen and oxygen to prevent the formation of toxic nitrous oxide and other undesirable nitrogen oxides and/or other oxidized products.

As explained above, the typical prior art steam reforming process is a two stage process. The reason for this is that in the first stage, while most of the CM is steam reformed (typically, approximately 60-70% of the amount of starting CM), carbon char is formed, and it has traditionally been believed that this char needs to be removed before the remaining CM can be steam reformed. However, surprisingly and unexpectedly, it has been discovered that the char, if heated sufficiently, can also be steam reformed, and need not be removed. This is beneficial because the steam reforming of the CM is more complete, and because there is less solid waste to dispose of.

Therefore, a single stream, one-stage steam reforming process has been designed as follows. The process employs a steam reforming rotary kiln that heats the CM to an elevated reforming temperature, approximately 650° C.-1100° C. (or higher as may be necessary), with varying residence times to generate substantially the complete conversion of CM into a finished syngas product comprised of primarily $H_2$ and CO. It is contemplated that any conventional steam reforming rotary kiln may be suitable; however, it is preferable (note that it is a specific claim of this invention that the system comprises a single rotating kiln with external heating, since there is a current patent invention that uses a single rotating kiln but uses "internal" combustion heating) that such rotary kiln be externally heated (rather than internally heated), since this reduces the chance that combustion/incineration will take place within the kiln and produce various noxious side product compounds. The objective in using a one-stage process is to provide sufficient temperature, turbulent mixing and residence time, in a single reaction zone, to achieve target conversion levels. This one-stage steam reforming process may include a polishing unit downstream from the kiln, to further reform the separated, but not completely reformed syngas into a cleaner syngas.

The inert solid slag left over in the kiln is then removed prior to polishing of this first stage steam reformed syngas as may be needed. This solid slag is cooled and can be sold as construction filler material. This inert solids extraction will typically represent a volume reduction of up to 98% of the original MSW mix.

The system preferably undergoes a dust removal process, in which dust particulate is removed from the reformed syngas. Conventional dust and particle separators/filters are employed, although preferably, this involves a vortical dust separator and a fine particulate filter. This vortical dust separation and removal may take place in the steam reforming rotary kiln. Alternatively, the dust particulates may be removed in similar containers downstream from the reforming rotary kiln. Meanwhile, heat extraction modules will be located downstream of the separator and filter respectively. The heat extractors are used to extract thermal energy from the hot syngas for the use either as direct heat, or for the production of electricity or for pre-heating kiln combustion air and/or preheating feed CM.

The next stage of cleaning will preferably comprise sorbent bed or equivalent technologies for removing fugitive acid and metal vapours or other poisons/pollutants to provide for specified syngas cleanliness for subsequent processes. This sorbent bed cleaning system will typically be located downstream of the dust and particulate removal, and will typically be located either upstream or downstream of the heat extraction modules (depending on temperature sensitivities of the sorbent bed materials and temperature dependencies for effective removal of fugitive and poisonous gases).

As explained above, the dual stream, multi-stage process is preferably used when there is a larger amount of metallic material in the MSW. It will be appreciated that in most cases, metal is separated out from MSW because of mandatory recycling, and also could be separated by means of metal separation units located on the conveyor feeding shredded MSW into the steam reforming kiln hopper. However, even so, there is often a substantial amount of metal in the MSW which can vaporize during the very high temperature steam reforming process. Also, the multi-stage process is designed to optimize energy consumption by the steam reforming process, as described below.

The preferred multi-stage steam reforming process is as follows. There is provided a first stage steam reforming rotary kiln that heats the CM to a reforming temperature of approximately 550° C. to 650° C. to generate the first phase of syngas production with metallic materials largely intact (i.e. not vaporized) and with residual carbon char. The first stage products are segregated into two streams: a second stage "dusty" gaseous stream; and a third stage solids stream. There is then provided a second stage steam reforming stationary kiln that heats the "dusty" gaseous inflow materials to an elevated reforming temperature of approximately 850° C. to 1100° C. (or higher as may be necessary) to complete the transformation of first stage gaseous materials by facilitating the complete conversion of carbonaceous gases into a syngas composed primarily of CO and $H_2$. This syngas will typically be rich in hydrogen, since much of the carbon is streamed to the third-stage steam reforming system described below. Note this second stage "stationary" kiln may be configured as a rotary kiln if found necessary to optimize conversion performance of this second stage.

Preferably, the process provides for the removal of dust and particulates between the first and second stages. This would typically be done with one or both of vortical dust separators and fine particulate filters. Alternatively, or in addition to this dust removal process, the process will also include the internal separation of dust and particles (entrained in the syngas flow) from the syngas before exiting either the first stage and/or the second and third stage steam reforming kilns. This internal separator will use an internally created strong vortical motion generated by stationary vanes in a converging cylindrical channel. The syngas being drawn through this exit converging cylindrical tube having integral gas turning vanes will generate the vortical centrifugal forces to allow for separation of particles denser than the syngas being drawn through this exit cylinder. Slots strategically located along the length of the exit cylinder will provide for the egress of particles with the radial momentum imparted by the vortical motion sufficient to separate these particles from the syngas stream exiting the steam reforming kiln. This internal separation device will typically be a cylindrical container, separate from the steam reforming rotating drum.

The carbon char is separated from the inert solid slag in the first stage kiln and fed to a third stage steam reforming rotary kiln that heats the residual carbon to an elevated reforming temperature of approximately 850° C. to 950° C. (or higher as may be necessary) to complete the transformation of the carbon char into a syngas composed of virtually equal volumes of CO and $H_2$ according to the steam reforming reaction (with x moles of excess $H_2O$):

$$C + H_2O + xH_2O \rightarrow CO + H_2 + xH_2O \quad (1)$$

Alternatively, the carbon char may be used directly as heating fuel for either the steam boiler or as heating fuel for one of the two prior stages of steam reformation, or used directly for product sales.

If needed, the outflow from the third stage can be directed to the second stage described above so that the outflow from the third stage can be polished. However, the syngas flowing out of the third stage is typically substantially cleaner than the first stage syngas and may not require polishing, where carbon char has been effectively separated from remainder of residue.

This multi-stage process also preferably includes heat extraction to capture useful energy as the syngas and solids cool. Two heat extraction modules may be staged separately and individually downstream of each of the second and third stages or may be staged downstream of a combined flow of syngas from these separate stages. These heat recovery units can be used to create electrical energy (using steam generation with turbines), or can simply capture the thermal energy used for heating or for pre-heating kiln combustion air and/or preheating feed CM.

The multi-stage steam reforming process may optionally include a cleaning unit to perform final cleaning of the syngas using sorbent bed or equivalent technologies for removing fugitive acid and metal vapours or other poisons/pollutants to provide for specified syngas cleanliness for subsequent processes. This sorbent bed cleaning system will typically be located downstream of the dust and particulate removal and will typically be located either upstream or downstream of the heat recovery units (depending on temperature sensitivities of the sorbent bed materials and temperature dependencies for effective removals of fugitive and poisonous gases).

It will be appreciated that the steam reforming process produces a syngas comprising $H_2$ and CO. It is desirable to produce a syngas with as high an $H_2/CO$ ratio as possible. The reason is that $H_2$ is more valuable as a commodity, and easier to convert to clean energy than is CO. Given global warming considerations, carbon is preferably sequestered rather than released into the atmosphere. This makes the CO more cumbersome to deal with.

There are two methods for maximizing the $H_2/CO$ ratio. The first is the feeding of excess moisture (above stoichiometric amounts) as an input into the steam reforming process which generates additional $H_2$ and $CO_2$ in equal abundance. The additional clean $CO_2$ can be separated and sequestered. The second method is the feeding of methane (particularly including landfill methane), or other hydrogen-rich materials, including waste oils, as an input into the steam reforming process.

Adding excess water and hydrogen rich hydrocarbons to the steam reforming process drives up the proportion of hydrogen relative to the proportion of carbon and oxygen in the steam reforming kiln. This in turn produces a higher $H_2/CO$ ratio. The principal role of excess water is simply to ensure that there is an adequate supply of steam to complete as close to 100% of the steam reforming as possible. Any steam reforming conversion of excess water beyond stoichiometric will result in the conversion of CO to $CO_2$ plus $H_2$. This creates an improved $H_2/CO$ ratio but also creates additional $CO_2$. Typically this method of improving the $H_2/CO$ ratio will be avoided since it incurs energy penalties and will require additional special processes for sequestering the $CO_2$. The advantage of this method of $CO_2$ sequestering is that the syngas mixture is relatively clean and $CO_2$ would in this case represent a significant proportion of the syngas and hence allow for an effective separation and sequestering of the $CO_2$.

Given the usefulness of methane as a steam reforming process input, the invention also preferably contemplates the use of landfill methane. This is convenient, as the steam reforming plant can be built near, adjacent to or directly on a landfill site, which can serve not only as a source of CM, but as a source of landfill methane.

There are a number of advantageous uses for the products of the steam reforming processes described above. These are listed below. For example, some or all of the syngas ($H_2$+CO) can be fed into a fuel cell. Fuel cells host an oxidation reaction. In the case of $H_2$+CO syngas, it is most preferred that a fuel cell such as a liquid carbonate fuel cell or a solid oxide fuel cell be used, because such a fuel cell can act on both $H_2$ and on CO. In respect of $H_2$, the gas is oxidized to produce $H_2O$ plus energy. In the case of CO, the fuel cell outputs $CO_2$ plus energy.

The syngas (or a portion thereof) can also be fed into a gas-to-liquid ("GTL") synthesis plant to produce selected synthesized hydrocarbon products, such as methanol, ethanol, polyethylene, polypropylene and equivalents thereof.

Excess $CO_2$ and steam from the GTL, or the $CO_2$ and steam from the fuel cell, can be channeled into a synergistically located greenhouse. This results in the sequestering of carbon in a manner beneficial to the environment. Meanwhile, the growth of fruit, vegetables, or other agricultural, horticultural or forest products within the greenhouse is enhanced. Also, the $CO_2$ may be captured and used for other commercial uses or introduced into a conversion process for the production of useful by-products.

The hydrogen from the syngas product may simply be extracted and sold or used for desired applications.

The CO of the syngas can be fed into a water gas shift reactor, where the following reaction takes place:

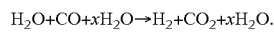

$$H_2O+CO+xH_2O \rightarrow H_2+CO_2+xH_2O.$$

Also, the GTL synthesis plant will typically have as an output excess CO not used when the syngas was fed into the plant. This additional CO can also be fed into a water gas shift reactor or can be fed to the fuel cell or sold as a commodity. The $H_2$ from the water gas shift reactor can be fed to a fuel cell as described above, while the $CO_2$ is sequestered as described above (by feeding it into a synergistically located greenhouse).

Alternatively, the CO and/or the $H_2$ from any one of the above steam reforming processes can be fed to a steam boiler/steam turbine and/or combustion engine for the production of electrical energy. In other words there can be a variety of separate and/or concurrent uses for the CO and $H_2$ including GTL conversion, commodity sales, fuel for fuel cells and/or fuel for a gas turbine and/or steam electrical generating unit.

The use of a fuel cell as described above requires a constant supply of fuel for that fuel cell. In other words, various problems arise if the supply of fuel is interrupted or intermittent, rather than constant. Because the production of syngas may be interrupted, natural gas, or suitably cleaned landfill gas, can be fed constantly into the fuel cell.

Some of this natural gas or landfill gas can be diverted to the steam reforming kiln. Preferably, almost all of the natural gas would be fed into the steam reforming kiln to enhance the hydrogen content of the syngas as described above. However, if the normal syngas production from MSW conversion is interrupted, there will be an automated bypass whereby the natural gas will be routed directly to the fuel cell to maintain the constant fuel supply.

Landfill methane can be used instead of natural gas to assure a constant supply of fuel for the fuel cell, with the steam reforming process being located synergistically near or directly on a landfill site. Landfill methane can also be used to heat the steam reforming kiln.

A portion of the product syngas itself can be used to heat one or more of the steam reforming kilns.

DETAILED DESCRIPTION OF THE INVENTION

Figure 1:
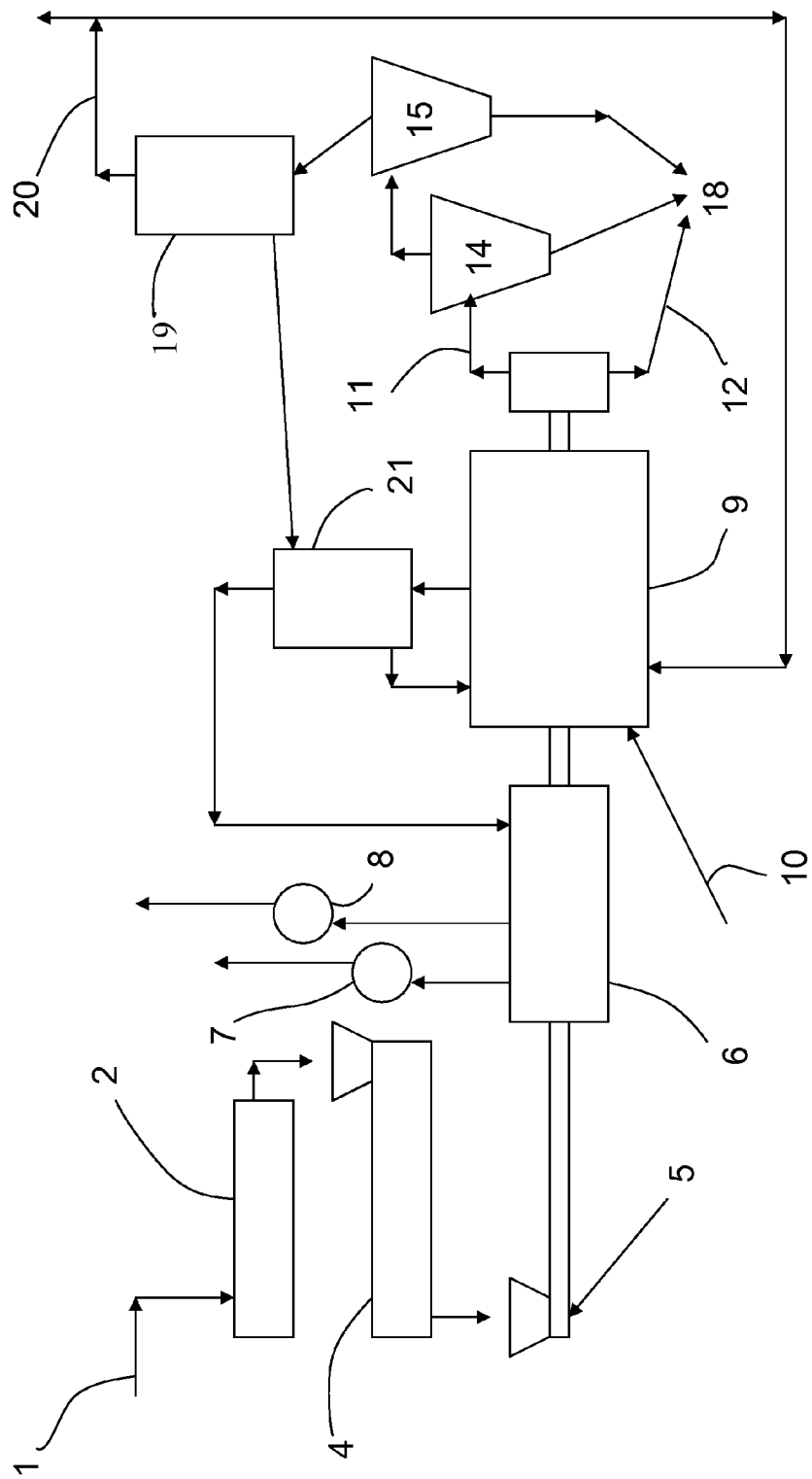
FIG. 1 shows a schematic diagram of a preferred embodiment of the present invention.

FIG. 1 is a schematic diagram of a preferred embodiment of the single stream, one-stage process. The CM input 1 is continuously fed into an auger or screw conveyor 2, where it is shredded in a shredder 4. The CM may optionally be pre-treated by passing through a pre-heater or rotary drum dryer 6 before being fed into the steam reforming rotary kiln 9. This serves to do one or more of the following: remove excess moisture from the CM, generate steam, and warm up the shredded CM (to approximately 250° C.) in readiness for the steam reforming reaction. Where necessary, make-up water and/or steam 5 is added to the shredded CM. As previously mentioned, it is advantageous to provide for a continuous feed of high temperature steam to purge the CM entering the steam reforming kiln 9 of air, (in particular, of oxygen and nitrogen). The pre-heater 6 is provided with one or more flue gas vents 7 and one or more steam vents 8 for releasing excess steam. The CM is then fed into the steam reforming kiln 9, which is externally heated. Commercial lime 10 is added to the steam reforming kiln so that it will react with any halogen compounds thereby removing such halogens from the CM. The CM is heated within the steam reforming kiln 9 to around 650° C.-1100° C., or higher as necessary depending on the make-up of the CM, and undergoes a virtual complete conversion via a steam reforming reaction to reformed syngas 11. The reformed syngas may optionally be further polished, for example by passing it through a vortical dust separator 14 and/or a fine particulate filter 15, to remove dust 16 and fine dust 17, respectively. The inert solid slag or kiln residue 12 left over after the steam reforming represents approximately 2% by volume of the starting CM input 1. The dust 16 and 17 separated from these polishing units, combined with the kiln residue 12 make up the total residual inert waste 18.

The hot, polished syngas may be passed through a heat extraction module 19 which may be used to create electrical energy (using steam generation with turbines), or simply to capture the thermal energy and reuse it for heating within the system. By way of example, heat extraction modules 19 and 21 may be used to capture thermal energy for use in the preheater 6 for pre-heating combustion air for the steam reforming rotary kiln 9, thereby improving plant efficiency. The product syngas 20 may be used in a number of different ways as previously described.

Figure 2:
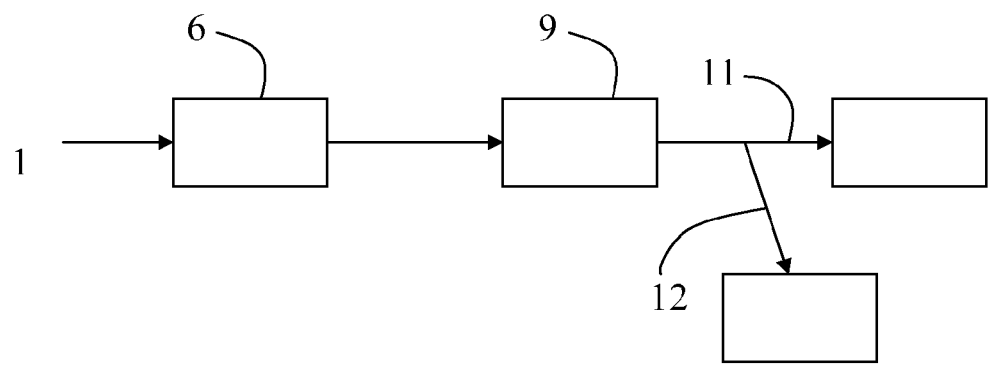
FIG. 2 shows a schematic diagram of the single stream, one-stage process.

FIG. 2 is a simplified schematic diagram of the single stream, one-stage steam reforming process of FIG. 1. As shown, the CM input 1 is pre-treated in a pre-heater 6 before being fed into steam reforming rotary kiln 9. The CM is heated in the steam reforming kiln to approximately 650-1100° C. (typically at the higher end of this range), where it undergoes a steam reforming reaction. Once the steam reforming process is completed, the reform syngas 11 is passed on for additional polishing and/or cleaning where required. The kiln residue 12 is removed from the steam reforming kiln 9.

Figure 3:
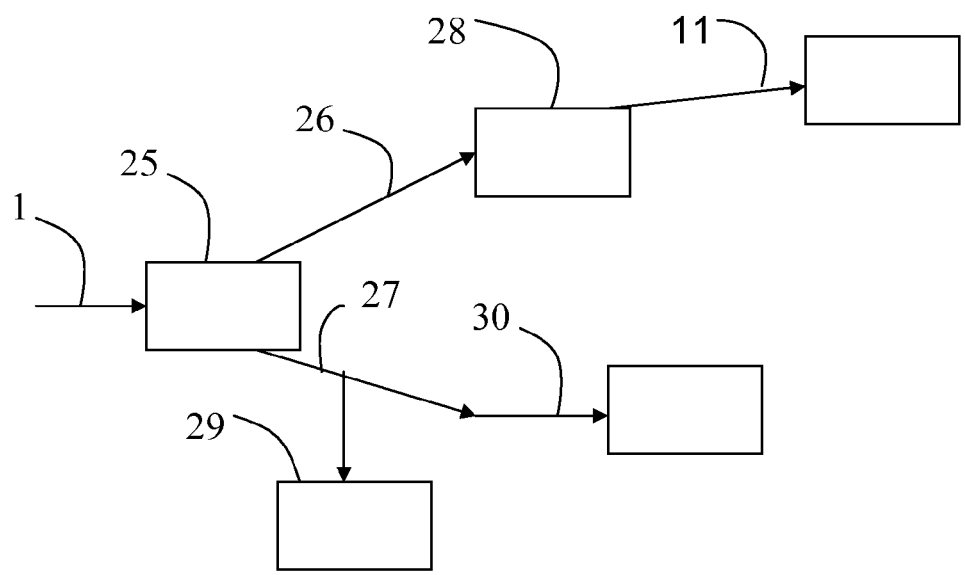
FIG. 3 shows a schematic diagram of one embodiment of the dual stream, multi-stage process.

FIG. 3 is a simplified schematic diagram of one embodiment of the dual stream, multi-stage steam reforming process. The CM input 1 is fed into a first stage steam reforming kiln 25 which heats the CM to approximately 550-650° C. The CM undergoes a first stage steam reforming reaction to form a second stage "dusty" gaseous stream 26 and third stage solids stream 27. At this reforming temperature, the metallic materials within the CM are largely intact (have not vaporized) and remain with the residual carbon char of the solids stream 27. The products of the dusty gaseous stream are passed to a second stage steam reforming stationary kiln 28, where they are heated to 850-1100° C. (or higher as necessary) to complete the conversion of these gaseous products to syngas 11. The carbon char in the solids stream 27 is separated from the inert solids slag or kiln residue 29. The separated carbon char 30 may be used directly for product sales.

Figure 4:
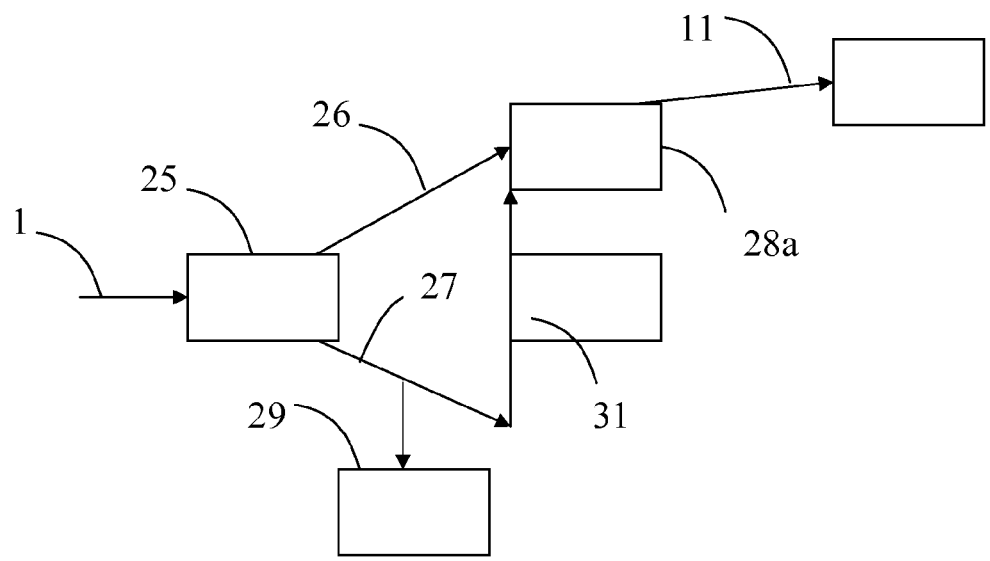
FIG. 4 shows a schematic diagram of another embodiment of the dual stream, multi-stage process.

FIG. 4 is a simplified schematic diagram of an alternative embodiment of the dual stream, multi-stage steam reforming process shown in FIG. 3. In this application, the separated carbon char 31 is fed into the second stage steam reforming rotary kiln 28a, along with the products of the gaseous stream to undergo steam reforming at an elevated reforming temperature. (The second stage reforming kiln 28a in this application would have to be a rotary kiln, in order to process the solid carbon feed.)

Figure 5:
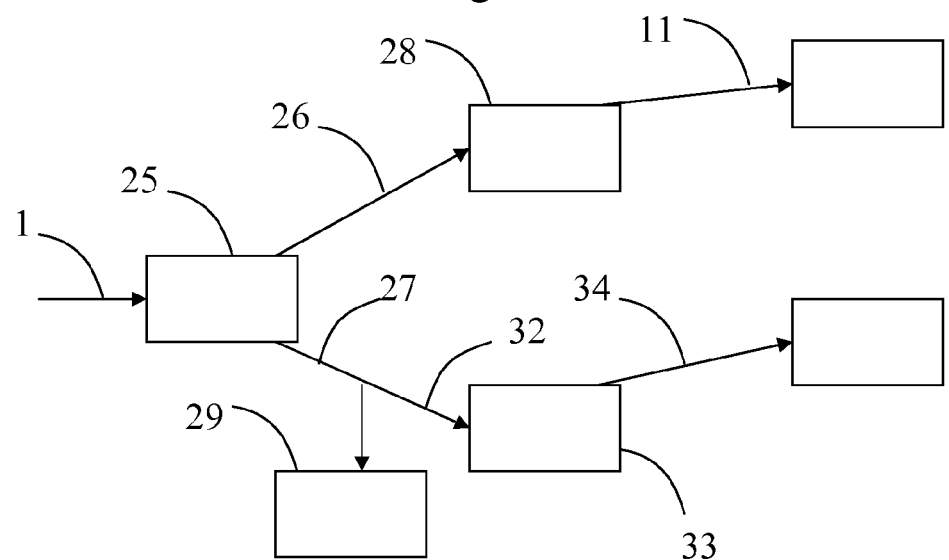
FIG. 5 shows a schematic diagram of another embodiment of the dual stream, multi-stage process.

FIG. 5 is a simplified schematic diagram of another embodiment of the dual stream, multi-stage steam reforming process shown in FIG. 3. In this application, the separated carbon char 32 is fed into a third stage steam reforming rotary kiln 33 and heated to approximately 850-950° C. (or higher as necessary) to complete the reforming of carbon char into syngas 34. (The third stage reforming kiln 33 in this application would have to be a rotary kiln, in order to process the solid carbon feed).

What is claimed is:

1. A method for steam reforming carbonaceous material into synthesis gas, said method comprising:
   feeding an input of carbonaceous material into a steam reforming rotary kiln;
   agitating the carbonaceous material using the steam reforming rotary kiln;
   externally heating the steam reforming rotary kiln to heat the carbonaceous material within the rotary kiln to an elevated reforming temperature of from about 650 to 1100° C. in the presence of water or steam, and without addition of carbon dioxide, and wherein the steam reforming rotary kiln is sealed from the atmosphere to prevent the entry of air or oxygen;
   reforming the carbonaceous material such that the carbonaceous material undergoes substantially complete conversion utilizing only a steam reforming reaction to form synthesis gas comprising primarily hydrogen and carbon monoxide and a minimal amount of inert solid slag.

2. The method of claim 1 further comprising the step of preheating or drying the carbonaceous material by passing the carbonaceous material through a preheater before being fed into the steam reforming rotary kiln.

3. The method of claim 1 wherein the carbonaceous material is continuously fed into the steam reforming rotary kiln using an auger or screw conveyor.

4. The method of claim 1 wherein commercial lime and/or a bicarbonate of soda is added to the carbonaceous materials within the steam reforming rotary kiln so as to react with and remove the presence of halogens within the carbonaceous material.

5. The method of claim 1 wherein high temperature steam is continuously fed into the base of a rotary kiln feed hopper in order to purge air from the carbonaceous material being fed via a screw auger into the steam reforming kiln.

6. The method of claim 1 wherein high temperature steam is continuously fed into the base of a rotary kiln feed hopper in order to purge air from the carbonaceous material being fed via a screw auger into the steam reforming kiln and to initiate preheating of the carbonaceous material being fed into the rotary kiln.

7. The method of claim 1 wherein the water or steam is present in excess (above stoichiometric amounts) sufficient to convert the entire carbonaceous material into syngas and to maximize the ratio of $H_2/CO$ in the synthesis gas formed during the steam reaction.

8. The method of claim 1 wherein the carbonaceous material is methane.

9. The method of claim 1 wherein the carbonaceous material is landfill methane obtained from a landfill site for the steam reforming rotary kiln.

10. The method of claim 2 wherein the carbonaceous material is landfill methane obtained from a landfill site for the steam reforming rotary kiln.

11. The method as claimed in claim 1, wherein the carbonaceous material is continuously fed into the steam reforming rotary kiln utilizing an auger or screw conveyor.

\* \* \* \* \*